US006217173B1

(12) United States Patent
Huang et al.

(10) Patent No.: US 6,217,173 B1
(45) Date of Patent: Apr. 17, 2001

(54) POLARIZED LIGHT SOURCE DEVICE FOR LIQUID CRYSTAL PROJECTOR

(75) Inventors: Junejei Huang, Taoyuan Hsien; Fang Chuan Ho, Hsinchu, both of (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 0 days.

(21) Appl. No.: 09/195,967

(22) Filed: Nov. 19, 1998

(30) Foreign Application Priority Data

Dec. 3, 1997 (TW) ................................ 86118198

(51) Int. Cl.[7] ................................ G03B 21/14
(52) U.S. Cl. ................................ 353/20; 349/9
(58) Field of Search ................................ 353/20, 38, 8, 353/31, 33, 34, 37; 349/8, 9; 359/487, 495, 496

(56) References Cited

U.S. PATENT DOCUMENTS

| 5,601,351 | * | 2/1997 | Van Den Brandt | 353/38 |
| 5,764,412 | * | 6/1998 | Suzuki et al. | 353/20 |
| 5,826,959 | * | 10/1998 | Atsuchi | 353/20 |
| 5,865,521 | * | 2/1999 | Hashizume et al. | 353/20 |
| 5,898,521 | * | 4/1999 | Okada | 359/487 |
| 6,036,318 | * | 3/2000 | Itoh | 353/20 |
| 6,062,695 | * | 5/2000 | Kakuda et al. | 353/20 |
| 6,067,193 | * | 5/2000 | Sekine et al. | 353/20 |

OTHER PUBLICATIONS

Y. Itoh et al., "Ultra–High–Efficiency LC Projector Using a Polarized Light Illuminating System", SID 97 Digest, 1997, pp. 993–996.

* cited by examiner

*Primary Examiner*—William Dowling

(57) ABSTRACT

A high-efficiency polarized illuminating system for a liquid crystal projector is disclosed. The illuminating system is easy to fabricate and set up, with a low cost since, unlike in the prior art, no particular component is needed in the illuminating system and the components used in the system does not require a highly precise alignment. The illuminating system comprises: A light source device for providing a light beam; a polarizing beam-splitting device for converting the light beam into a p-polarized light beam and an s-polarized light beam; a first lens plate for converging the p-polarized light beam and the s-polarized light beam into a plurality of light spots; a polarization rotating device for optionally passing the plurality of light spots formed by the p-polarized light beam or the s-polarized light beam to output the plurality of light spots with a certain polarization; and a second lens plate for projecting the plurality of light spots to form a plurality of light beams having the certain polarization, in which the plurality of light beams are overlapped on a converging lens to form a polarized light beam that is converged on a liquid crystal panel.

18 Claims, 4 Drawing Sheets

POLARIZED LIGHT SOURCE DEVICE FOR LIQUID CRYSTAL PROJECTOR

BACKGROUND OF THE INVENTION

1. Field of the Invention

The present invention relates to a light source and, more particularly, to a high-efficiency polarized light source device for a liquid crystal projector.

2. Description of Prior Art

In a conventional liquid crystal (hereinafter referred to as LC) projector, the LCd is play panel is normally rectangular, but the cross-section of the projecting beam emitted from the light source is circular. Therefore, the light energy distributed in the circumferential areas is sacrificed in order to irradiate the whole LC display panel. Moreover, since an LC projector requires polarized light, half the light energy is lost while the non-polarized light emitted from the light source is being polarized.

Because of the above problems, the brightness of the display in a conventional LC projector is not sufficient for image projection. One solution is to provide a light source with a higher power. However, this causes some other problems in that this approach not only consumes much more electricity, but also generates undesirable heat that will cause further problems.

In order to overcome such problems, other optical systems have been developed in the prior art. For example, and referring to FIG. 1, U.S. Pat. No. 5,098,184 discloses an illumination system for an image projection apparatus. The illumination system comprises a radiation source 22, a concave reflector 24 and a first and a second lens plate 26, 28 each being provided with a matrix of lenses for forming superimposed images of the radiation source on the object to be illuminated. The first lens plate 26 and the second lens plate 28 are utilized to redistribute the light intensity. Furthermore, the shape of each lens 27 and lens 29 corresponds to the shape of the LC display panel 20. Thus, this invention can provide a uniform brightness and efficiently make use of the light energy. However, that half the light energy is lost while converting the non-polarized light into polarized light still remains a problem.

In order to improve the efficiency of the LC projector, it is important to reduce the light energy lost while generating polarized light. A prior art entitled "Ultra-High-Efficiency LC Projector Using a Polarized Light Illuminating System" has been disclosed in SID 97 DIGEST, pp. 993 to 996, by Nakamura et al.

Referring to FIG. 2, the illuminating system includes a light source 30; a reflector 31; a first lens plate 35; a second lens plate 38; a polarizing beam-splitter array 140; a plurality of half wave plates 145; and a condenser lens 50. The first lens plate 35 includes a plurality of rectangular lenses 36 having a geometrical shape similar to the liquid crystal panel 5.

The second lens plate 38 includes a plurality of lenses 139 corresponding to the lenses 36 included in the first lens plate 35.

The polarizing beam-splitter array 140 includes a plurality of beam splitters, which is placed in the rear of the second lens plate 38 for splitting and polarizing the light beams into s-polarized light beams and p-polarized light beams.

The plurality of half wave plates 145 corresponding to the polarizing beam-splitter array 140 are placed on the paths of the s-polarized light beams or the paths of the p-polarized light beams to output alight beam having the same polarization. And the condenser lens 50 projects the light beam onto the liquid crystal panel 5.

In the illuminating system described above, the non-polarized light beam is converted into p-polarized light or s-polarized light by using a plurality of polarizing beam-splitters 140. Each polarizing beam-splitter can optionally pass the p-polarized light or the s-polarized light. The half wave plates 145 are alternately disposed at the output of the polarizing beam-splitter. Refer to FIG. 3, for example, while the non-polarized light beam P+S is incident into the polarizing beam splitter 141 through the lens 139, the p-polarized light beam P1 is transmitted through the polarizing beam splitter 141 and the s-polarized light beam S1 is reflected. The p-polarized light beam P1 is then passed through the half wave plate 145 and converted into an s-polarized light beam S2. Thus the light beam output from the polarizing beam splitter is s-polarized light beam S1+S2. In other words, the light energy of the light source device being inputted into the polarizing beam splitter is totally converted into a light beam having the same polarization. The performance of the LC projector can be markedly raised. However, the fabrication of the illuminating system is too complex. A plurality of tiny polarizing beam splitters have to be cemented together. It is very difficult to exactly align the surfaces coated with a semi-reflecting coating for each polarizing beam splitter to be parallel with each other. Furthermore, the position of the halfwave plate has to exactly correspond to the polarizing beam splitter. That is, only one of the light beams split by the polarizing beam splitter passes through the half wave plate, while the other one does not. Moreover, the alignment of the polarizing beam splitter in the LC projector must be precise. This causes some inconvenience to make use of such an illuminating system.

SUMMARY OF THE INVENTION

Accordingly, in order to overcome the problems of the prior art, an object of the present invention is to provide a polarizing light source device for a liquid crystal projector that simplifies the fabrication and set-up of the liquid crystal projector and significantly improves its luminous efficiency.

To achieve the above object, this invention utilizes a first lens plate and a second lens plate to redistribute the light energy generated by the light source device. Furthermore, a half wave plate is utilized to make uniform the polarization of the light beams split by a beam splitter. However, in order to simplify the fabrication of the LC projector, the polarizing beam splitter mentioned above is not used in the present invention. This invention employs common polarizing beam splitting devices such as a Wallaston prism or a wedge having a polarizing semi-reflector formed thereon.

Unlike the polarizing beam splitter in the prior art, the polarizing beam-splitting device used in this invention can be placed before or after the second lens plate. That is, the configuration of the LC projector is variable.

BRIEF DESCRIPTION OF THE DRAWINGS

The detailed description is made with reference to the accompanying drawings, wherein.

Other objects and further features of the present invention will become more apparent from the following detailed description when read in conjunction with the accompanying drawings.

DETAILED DESCRIPTION OF THE PREFERRED EMBODIMENTS

Figure 1:
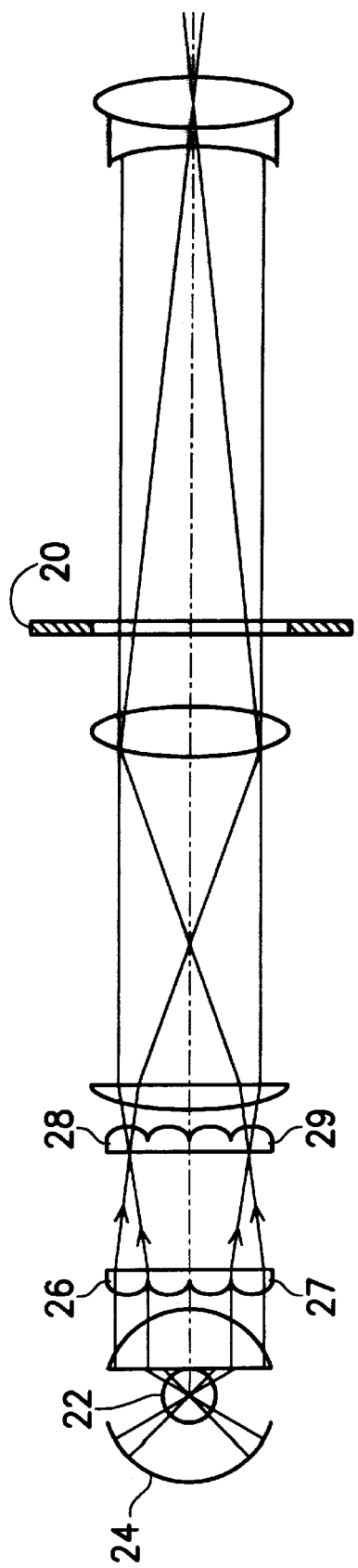
FIG. 1 is a diagram illustrating the structure of a conventional liquid crystal projector.
Figure 2:
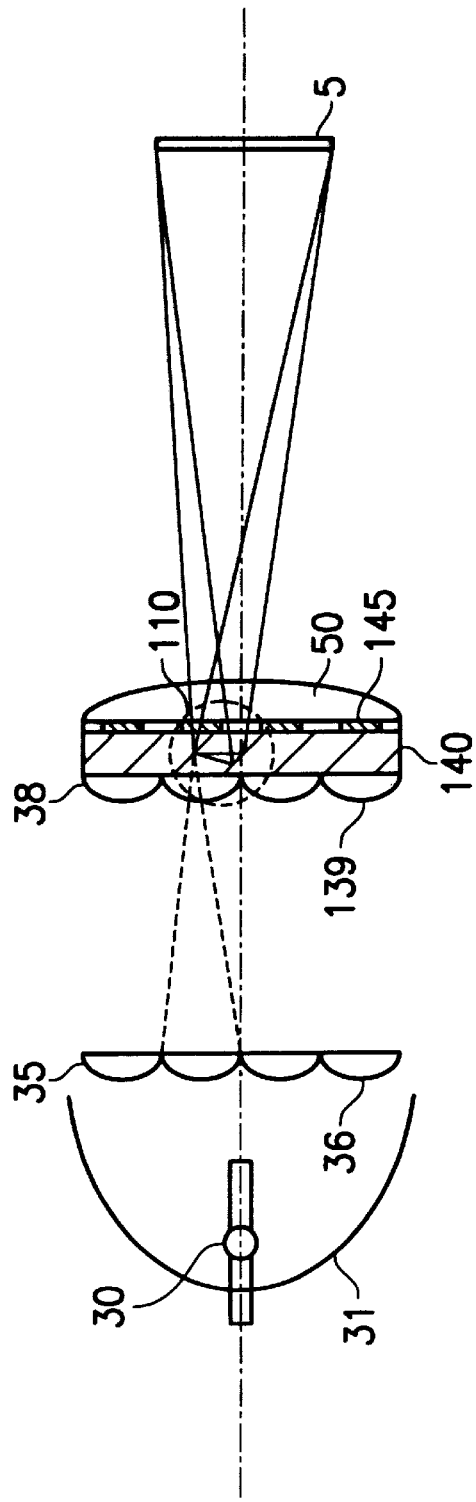
FIG. 2 is a diagram illustrating the structure of another conventional liquid crystal projector.
Figure 3:
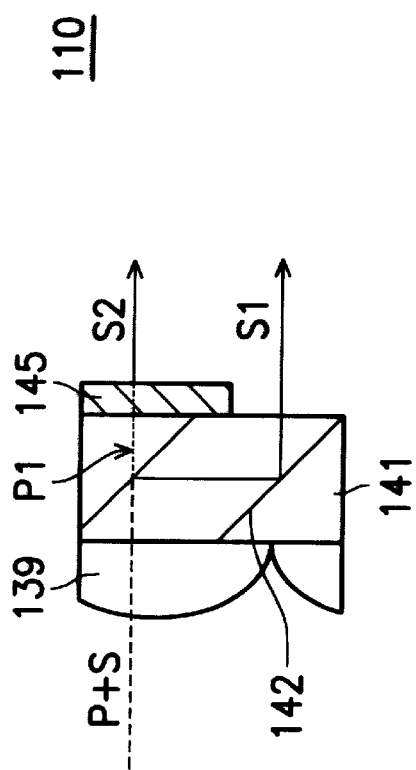
FIG. 3 is a diagram illustrating the optical path in the polarizing beam splitter for the liquid crystal projector shown in FIG. 2.
Figure 4:
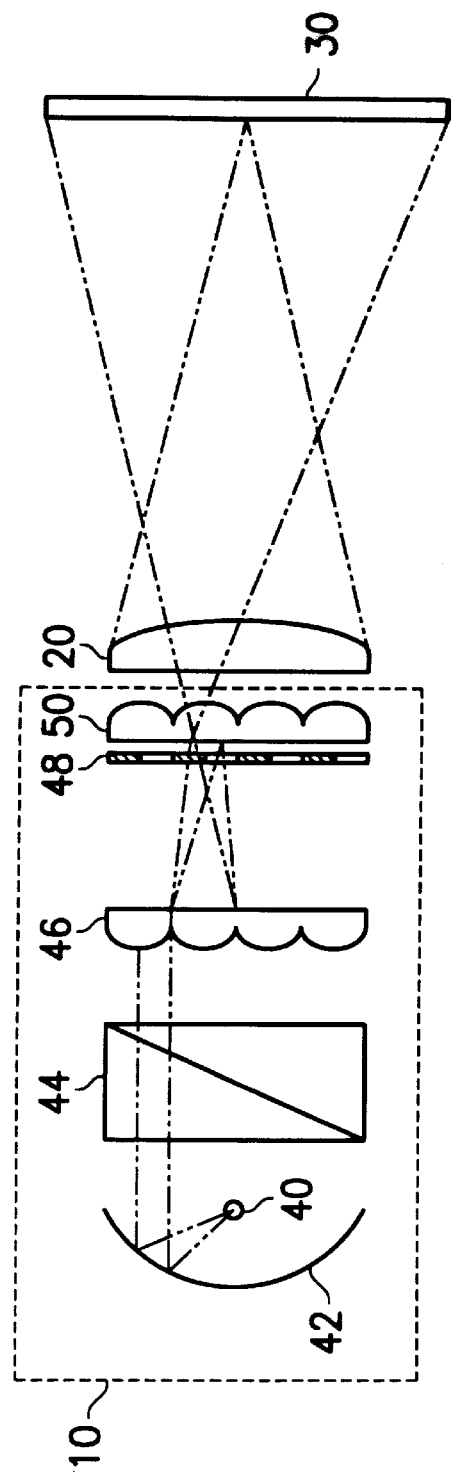
FIG. 4 is a diagram illustrating the light source device for a liquid crystal projector according to one embodiment of this invention.

Referring to FIG. 4, according to the first embodiment of this invention, the liquid crystal projector comprises: A light source 10 for providing a linearly polarized light beam; a condenser 20, placed after the light source 10, for converging the polarized light beam; and a liquid crystal panel 30 being illuminated by the polarized light beam, so as to project images displayed on the liquid crystal panel 30 on a screen.

The optical layout of the illumination system, i.e., the light source 10, is also shown in FIG. 4. The illumination system includes a lamp 40, a reflector 42, a Wallaston prism 44, a first lens plate 46, a polarization direction rotator 48 and a second lens plate 50. The lamp 40 emits light in the direction of the display panel as well as in the rearward direction. The reflector 42 receives the rearwardly emitted light and then forms a parallel beam. The parallel beam is incident on the Wallaston prism 44. The Wallaston prism 44 can convert the unpolarized parallel beam into two linearly polarized light beams: A p-polarized light beam and an s-polarized light beam.

For the sake of simplicity, the first lens plate 46 only includes four lenses in FIG. 4. In practice, however, the array 46 might comprise, for example, 16×9 lenses. Each of the lenses of the first lens plate 46 images the lamp 40 on a corresponding lens of a second lens plate 50. In this embodiment, since the p-polarized light beam and the s-polarized light beam are incident to the first lens plate 46 at different angles, the p-polarized light spot and the s-polarized light spot formed by the first lens plate 46 are spaced apart at a certain distance. As a result, a plurality of p-polarized light spots and a plurality of s-polarized light spots are alternately formed on the polarization direction rotator 48, since that the first lens plate 46 consists of a plurality of lenses.

Figure 5:
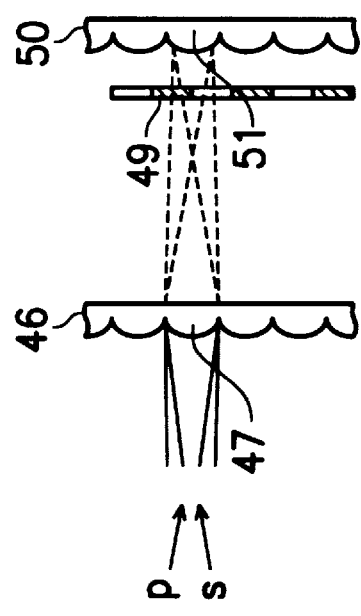
FIG. 5 is a schematic diagram illustrating the process of converting non-polarized light into a single light beam having the same polarization.

The configuration of the polarization direction rotator 48 has to be designed corresponding to the first lens plate 46. For example, the polarization direction rotator 48 includes a plurality of half wave plates. The number of half wave plates equals the number of lenses on the first lens plate 46. Corresponding to each lens of the first lens plate 46, each half wave plate is located at a certain position on the polarization direction rotator 48 to receive only p-polarized light spots or only s-polarized light spots. Referring to FIG. 5, the p-polarized light beam p and the s-polarized light beam s are respectively focused on the upper portion and the lower portion of the corresponding lens 51 of the second lens plate 50 by the lens 47 of the first lens plate 46. Therefore, the p-polarized light spot is directly incident to the lens 51. On the other hand, the s-polarized light spot formed by the lens 47 passes through the half wave plate 49 and then is converted into a p-polarized light spot. That is, all of the light spots become p-polarized after passing through the polarization direction rotator 48. The polarization direction rotator 48 can be disposed in front of or at the back of the second lens plate 50 in a manner such that the polarization direction rotator 48 can control whether p-polarized light or s-polarized light passes through the half wave plates.

Each lens of the second lens plate 50 ensures that a radiation spot formed on the corresponding lens is imaged on the display panel 30. The condenser 20 ensures that all re-images are superimposed on one another in the plane of the display panel 30 and is arranged behind the second lens plate 50. This results in a desired uniformity for the illumination intensity distribution in this plane.

The liquid crystal display panels which are used when displaying conventional video images have an aspect ratio of 4:3. In this embodiment, the lenses of the plates have the same aspect ratio. As a result, all radiation coming through the first lens plate passes through the display panel and the illumination system has a high collection efficiency.

Furthermore, the first lens plate consists of a plurality of rectangular lenses having a geometrical cross section similar to the display panel.

Figure 6:
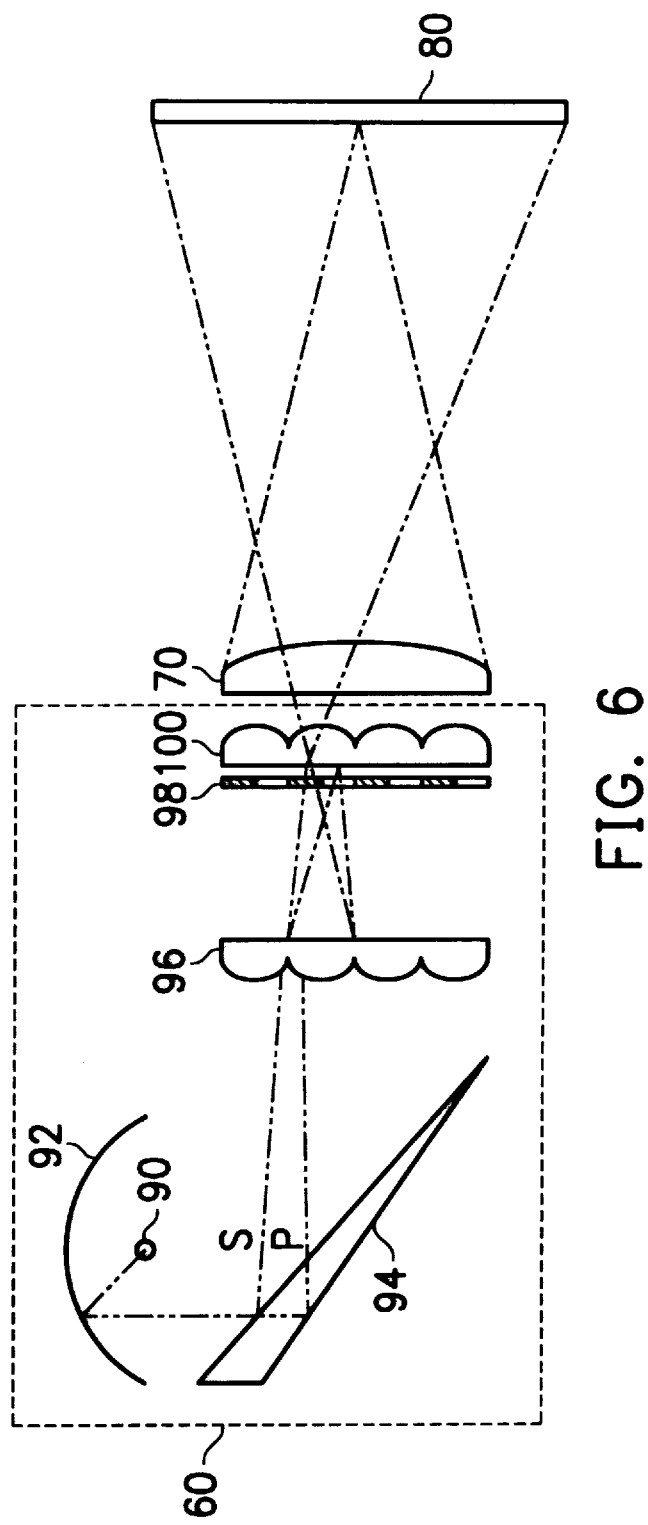
FIG. 6 is a diagram illustrating the light source device for a liquid crystal projector according to another embodiment of this invention.

Referring to FIG. 6, according to the second embodiment of this invention, the liquid crystal projector comprises: A light source 60 for providing a linearly polarized light beam; a condenser 70, placed after the light source 60, for converging the polarized light beam; and a liquid crystal panel 80 being illuminated by the polarized light beam, so as to project images displayed on the liquid crystal panel 80 on a screen.

In this embodiment, the optical layout of the illumination system, i.e., the light source 60, is also shown in FIG. 6. The illumination system includes a lamp 90, a reflector 92, a wedge 94, a first lens plate 96, a polarization direction rotator 98 and a second lens plate 100.

The main difference of this embodiment and the previous embodiment is that the beam-splitting polarizer used in the previous embodiment is the Wallaston prism and in this embodiment is the wedge.

The lamp 90 emits light in the direction of the display panel as well as in the rearward direction. The reflector 92 receives the rearwardly emitted light and then forms a parallel beam. The parallel beam is incident to the wedge 94.

Figure 7:
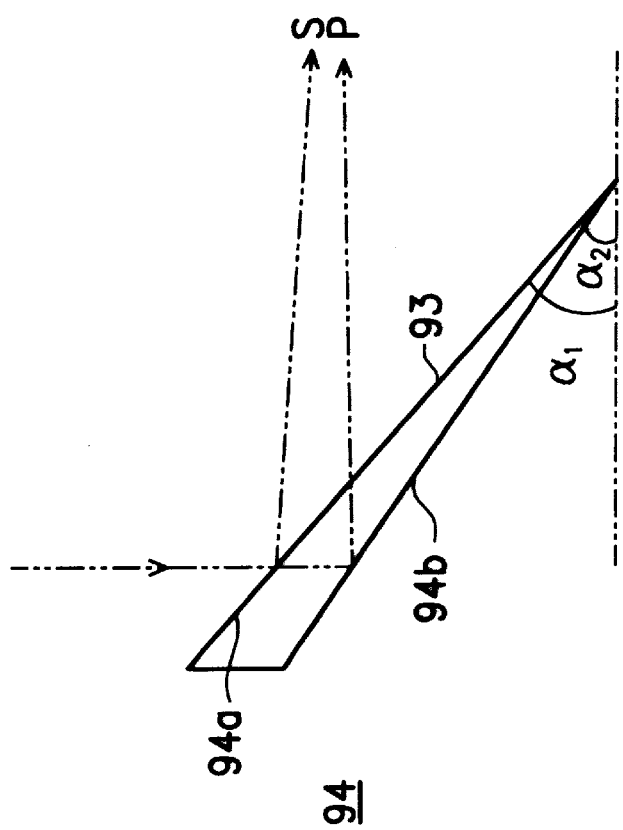
FIG. 7 is a diagram illustrating the optical path in a wedge having a polarizing semi-reflector formed thereon, which is applied to the liquid crystal projector shown in FIG. 6.

Referring to FIG. 7, the wedge 94 has a polarized beam splitting coating on the first surface 94a and a mirror on the second surface 94b. While the unpolarized light beam passes the first surface 94a of the wedge 94, for example, the s-polarized light beam S is reflected by the beam-splitting polarizer and the p-polarized light beam P transmits across the beam-splitting polarizer. Then, the p-polarized light beam is reflected by the mirror as it reaches the second surface 94b. Both the p-polarized light beam and the s-polarized light beam are incident to the first lens plate 96. The degree of polarization for the polarized beam-splitting coating is operated at an angle of $(\alpha_1-\alpha_2)$, where $\alpha_1$ is the angle between the first surface 94a and the optical axis of the LCD panel 80, and $\alpha_2$ is the angle between the second surface 94b and the optical axis of the LCD panel 80. Furthermore, the angle between the p-polarized light beam and the s-polarized light beam equals $(\alpha_1-\alpha_2)/2$.

Figure 8:
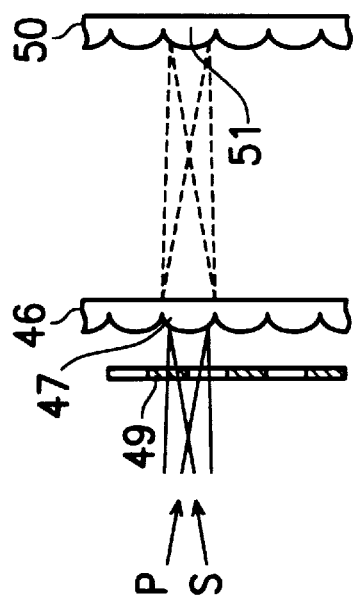
FIG. 8 is a schematic diagram illustrating the process of converting nonpolarized light into a single light beam having the same polarization similar to FIG. 5 but showing the half wave plate in a position in front of the first lens plate.

With reference to FIG. 8, an alternate embodiment of the arrangement illustrated in FIG. 5 and discussed in relation thereto is shown. Like the arrangement of FIG. 5, the first lens plate 46 (provided with the lens 47) and the second lens plate 50 (provided with the lens 51) are provided in a spaced-apart arrangement. However, unlike the arrangement of FIG. 5, the half wave plate 49 is positioned in front of the first lens plate 46.

In the above two embodiments, the reflector is used to produce a parallel light beam. Therefore, the reflector can be a paraboloid mirror or an ellipsoid mirror.

The beam-splitting polarizer used is a Wallaston prism in the first embodiment and is a wedge in the second embodiment. However, according to the scope of this invention, the beam-splitting polarizer is not limited to the Wallaston prism or the wedge, but can be any device that can convert an unpolarized light beam into a p-polarized light beam and an s-polarized light beam, in which the p-polarized light beam and the s-polarized light beam are not parallel to each other. The angle between the p-polarized light beam and the s-polarized light beam is determined according to the following equation:

$$\tan\theta = D/2f,$$

where D is the diameter of the aperture of a lens at the first lens plate, and f is the focal length of a lens at the second lens plate.

The first lens plate and the second lens plate can be designed in the following process. First, the vertex point of each lens on the first lens plate can be determined in accordance with the converging point of the light source and the center of each lens on the second lens plate. Second, the vertex point of each lens on the second lens plate can be determined in accordance with the center of the LCD panel and the center of each lens on the first lens plate. Then, the focal length of each lens on the first lens plate can be determined to focus the converging point of the parallel light beam on the second lens plate. Thereafter, the focal length of each lens at the second lens plate is determined to image a corresponding lens of the first lens plate on the LCD panel.

Regarding the beam-splitting polarizer, the angle A between the p-polarized light beam and the s-polarized light beam can be worked out with the diameter D of each lens at the first lens plate and the distance between the first lens plate and the second lens plate.

$$\tan A = D/2f,$$

The prism angle B of the beam-splitting polarizer is then determined, wherein $$\tan A = 2(n_e-n_o)\tan B$$

in case that the Wallaston prism is used as the beam-splitting polarizer, and $$B = A/2$$

in case that the wedge is used. Where $n_e$ is the refractive index of the extraordinary ray and $n_o$ is the refractive index of the ordinary ray.

According to the above description, this invention possesses the advantages of ease in fabrication and set up of the illuminating system with a low cost since, unlike the prior art, no particular component is needed and the components used in this invention do not require a highly precise alignment.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An illuminating system for a liquid crystal projector comprising:
    a light source device for providing a light beam;
    a polarizing beam-splitting device for converting the light beam into a p-polarized light beam and a s-polarized light beam, said polarizing beam-splitting device being a wedge having a polarizing semi-reflector formed thereon;
    a first lens plate for converging the p-polarized light beam and the s-polarized light beam into a plurality of light spots;
    a polarization rotating device for passing the light spots of one of the s- and p-polarized light is passed by the device while the other is rotated so as to output the plurality of light spots with a certain polarization; and
    a second lens plate for projecting the plurality of light spots to form a plurality of light beams having the certain polarization, in which the plurality of light beams are overlapped on a converging lens to form a polarized light beam that is converged on a liquid crystal panel.

2. An illuminating system for a liquid crystal projector comprising:
    a light source device for providing a light beam;
    a polarizing beam-splitting device for converting the light beam into a p-polarized light beam and a s-polarized light beam, said polarizing beam-splitting device being a Wallaston prism;
    a first lens plate for converging the p-polarized light beam and the s-polarized light beam into a plurality of light spots;
    a polarization rotating device for passing the light spots of one of the s- and p-polarized light is passed by the device while the other is rotated so as to output the plurality of light spots with a certain polarization; and
    a second lens plate for projecting the plurality of light spots to form a plurality of light beams having the certain polarization, in which the plurality of light beams are overlapped on a converging lens to form a polarizing light beam that is converged on a liquid crystal panel.

3. An illuminating system for a liquid crystal projector as claimed in claim 2, wherein said polarization converting unit device, which is placed before said first lens plate, includes a plurality of half wave plates that are alternately arranged to pass either the p-polarized light beam or the s-polarized light beam.

4. An illuminating system for a liquid crystal projector as claimed in claim 2, wherein an aspect ratio of each lens on the first lens plate is equal to an aspect ratio of the liquid crystal panel.

5. An illuminating system for a liquid crystal projector as claimed in claim 2, wherein the first lens plate is a lens array including a plurality of lenses.

6. An illuminating system for a liquid crystal projector as claimed in claim 2, wherein the second lens plate is a lens array including a plurality of lenses.

7. An illuminating system for a liquid crystal projector as claimed in claim 2, wherein the specification of the Wallaston prism has to satisfy the following equation: $n_e \tan A = 2(n_e - n_o) \tan B$ where A is an angular separation between the p-polarized light beam and the s-polarized light beam, B is the cut angle of the prism, $n_e$ is the refractive index of extraordinary light beam and $n_o$ is the refractive index of ordinary light beam.

8. An illuminating system for a liquid crystal projector as claimed in claim 1 wherein said polarization converting unit device, which is placed in front of said first lens plate, includes a plurality of half wave plates that are alternately arranged to pass either the p-polarized light beam or the s-polarized light beam.

9. An illuminating system for a liquid crystal projector as claimed in claim 1, wherein the aspect ratio of each lens on the first lens plate is equal to the aspect ratio of the liquid crystal panel.

10. An illuminating system for a liquid crystal projector as claimed in claim 1, wherein the first lens plate is a lens array including a plurality of lenses.

11. An illuminating system for a liquid crystal projector as claimed in claim 1, wherein the second lens plate is a lens array including a plurality of lenses.

12. An illuminating system for a liquid crystal projector as claimed in claim 1, wherein the wedge has to meet the requirement of the following equation $B = A/2$ where A is the angular separation between the p-polarized light beam and the s-polarized light beam, and B is the vertex angle of the prism.

13. An illuminating system for a liquid crystal projector as claimed in claim 5, wherein each lens on said first lens plate can focus the light beam onto said second lens plate.

14. An illuminating system for a liquid crystal projector as claimed in claim 10, wherein each lens on the first lens plate can focus the light beam onto the second lens plate.

15. An illuminating system for a liquid crystal projector as claimed in claim 5, wherein each lens on said second lens plate can image a corresponding lens of said first lens plate on said liquid crystal panel.

16. An illuminating system for a liquid crystal projector as claimed in claim 10, wherein each lens on the second lens plate an image a corresponding lens of the first lens plate on the liquid crystal panel.

17. An illuminating system for a liquid crystal projector as claimed in claim 1, wherein said polarization-rotating device, which is placed at the back of said first lens plate, includes a plurality of half wave plates that are alternately arranged to pass either the polarized light beam or the s-polarized light beam.

18. An illuminating system for a liquid crystal projector as claimed in claim 2, wherein said polarization-rotating device, which is placed after said first lens plate, includes a plurality of half wave plates that are alternately arranged to pass either the p-polarized light beam or the s-polarized light beam.

* * * * *